United States Patent
Wang et al.

(10) Patent No.: US 10,055,741 B2
(45) Date of Patent: Aug. 21, 2018

(54) METHOD AND APPARATUS OF MATCHING AN OBJECT TO BE DISPLAYED

(71) Applicant: Alibaba Group Holding Limited, Grand Cayman (KY)

(72) Inventors: Tao Wang, Hangzhou (CN); Peng Huang, Hangzhou (CN); Feng Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 305 days.

(21) Appl. No.: 14/851,464

(22) Filed: Sep. 11, 2015

(65) Prior Publication Data

US 2016/0078121 A1 Mar. 17, 2016

(30) Foreign Application Priority Data

Sep. 11, 2014 (CN) .......................... 2014 1 0461059

(51) Int. Cl.
*G06F 17/30* (2006.01)
*G06Q 30/00* (2012.01)

(52) U.S. Cl.
CPC ......... *G06Q 30/00* (2013.01); *G06F 17/3097* (2013.01)

(58) Field of Classification Search
CPC .................................................. G06F 17/3064
See application file for complete search history.

(56) References Cited

U.S. PATENT DOCUMENTS

| 8,296,296 | B2 | 10/2012 | Keith, Jr. |
| 8,793,237 | B2 | 7/2014 | Matesso et al. |
| 2006/0195461 | A1* | 8/2006 | Lo .................... G06F 17/30011 |
| 2007/0168357 | A1 | 7/2007 | Mo |
| 2008/0235148 | A1 | 9/2008 | Liu |
| 2012/0239488 | A1* | 9/2012 | Zimmerman ...... G06Q 30/0256 705/14.41 |
| 2013/0339369 | A1 | 12/2013 | Li |
| 2014/0136524 | A1 | 5/2014 | Liu |
| 2015/0213536 | A1 | 7/2015 | Liu |

OTHER PUBLICATIONS

PCT Search Report and Written Opinion dated Dec. 29, 2015 for PCT Application No. PCT/US15/49632, 9 pages.

* cited by examiner

*Primary Examiner* — Hung Q Pham
(74) *Attorney, Agent, or Firm* — Lee & Hayes, PLLC

(57) ABSTRACT

A method and an apparatus of matching an object to be displayed are disclosed. The method includes obtaining a plurality of search keywords and released product information and grouping each of the plurality of search keywords with the released product information to form a plurality of search keyword and released product information pairs, with each search keyword and released product information pair comprising a respective search keyword and the released product information; determining and matching a plurality of features for the plurality of search keyword and released product information pairs according to a constructed first decision tree; and determining respective correlation classes of the plurality of search keyword and released product information pairs based at least in part on a result of determining and matching of the plurality of features. The disclosed method and apparatus are able to accurately and conveniently determine a matching degree between a search keyword and released product information.

20 Claims, 7 Drawing Sheets

METHOD AND APPARATUS OF MATCHING AN OBJECT TO BE DISPLAYED

CROSS REFERENCE TO RELATED PATENT APPLICATION

This application claims foreign priority to Chinese Patent Application No. 201410461059.0 filed on Sep. 11, 2014, entitled "Method and Apparatus of Matching an Object to be displayed", which is hereby incorporated by reference in its entirety.

TECHNICAL FIELD

The present disclosure relates to the field of Internet technology, and more particularly, to methods and apparatuses of matching an object to be displayed.

BACKGROUND

Matching an object to be displayed involves a matching degree between a search keyword (also referred to as query) selected by a user and product information to be released or promoted. Existing technologies usually adopt a linear model constructed by text correlation features to calculate a score of correlation between the search keyword and the released or promoted product information. The matching degree between the search keyword and the released product information is determined based on the correlation score, and the user is recommended to select a search keyword having a high matching degree. The calculation of the correlation score includes firstly assigning a weight to each type of text correlation features to indicate a degree of importance of each type of the text correlation features. The text correlation features include correlation features such as a rate of matching between the search keyword and a title of the released product information, a position and an ordering of a term extracted from the search keyword within the title of the released product information, etc. Secondly, values of the text correlation features are labeled for samples of search keyword and released product information pairs (i.e., query and offer pairs) using human experience, and all search keyword and released product information pairs are labeled by referencing the labeled samples. Thirdly, a linear model $s=\Sigma_i^I w_i * f_i$ is used to calculate the correlation score for the search keyword and the released product information, where $w_i$ is the weight of each type of the text correlation features, $f_i$ is a value of each type of the text correlation features, I represents a feature space, and s is the correlation score for the search keyword and the released product information.

However, due to the excessively large number of search keyword and released product information pairs in reality, a large amount of system resources are consumed for labeling text correlation feature values thereof. Moreover, the number of samples that are labeled using human experience is limited, and labeling all the search keyword and released product information pairs based on the labeled samples is impossible. Furthermore, an accuracy of labeling the values of the text correlation features for the samples using human experience is very low. In addition, in an event that a system maintenance personnel is replaced, the number of text correlation features is increased or decreased and an associated system is upgraded, the values of the text correlation features need to be relabeled, thus resulting in a high maintenance cost. When complaints are received from customers, labeling the values of the text correlation features using human experience cannot be used as an effective explanation to the customers.

Therefore, how to accurately and conveniently determine a degree of matching between a search keyword and released product information has become a technical problem that needs to be solved.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

In view of the above, the present disclosure provides a determination method of matching of an object to be displayed and an apparatus thereof, which are able to accurately and conveniently determine a degree of matching between a search keyword and released product information, thereby reducing customer complaints and maintenance cost.

In an aspect of the present disclosure, a determination method for matching an object to be displayed is provided. The method includes obtaining a plurality of search keywords and released product information, and grouping each of the plurality of search keywords with the released product information to form search keyword and the released product information pairs; matching and determining a plurality of features for the search keyword and released product information pairs based on a constructed first decision tree; and determining respective correlation classes of the search keyword and released product information pairs based on a result of matching and determining of the plurality of features.

The present disclosure further provides a determination apparatus for matching an object to be displayed, which includes a pairing module to obtain a plurality of search keywords and released product information, and to group each of the plurality of search keywords with the released product information to form search keyword and released product information pairs; a matching module to determine and match a plurality of features for the search keyword and released product information pairs based on a constructed first decision tree; and a determination module to determine respective correlation classes of the search keyword and released product information pairs based on a result of matching and determining of the plurality of features.

Based on the aforementioned technical solutions, the present disclosure groups each of a plurality of search keywords with released product information to form search keyword and released product information pairs, and performs matching and determination of a plurality of features based on a constructed first decision tree, thereby determining correlation classes of the search keyword and released product information pairs according to a result of matching and determination of the plurality of features. Therefore, the present disclosure does not need to adopt a linear model constructed by text correlation features to calculate a score for correlation between a search keyword and released product information, or to label values of the text correlation features associated with the search keyword and released product information pairs. The present disclosure is able to accurately and conveniently determine a degree of matching between the search keyword and the released product information, thereby reducing customer complaints and maintenance cost.

DESCRIPTION OF THE DRAWINGS

In order to describe technical solutions of exemplary embodiments of the present disclosure or the existing technologies in a clear manner, the accompanying drawings which describe the embodiments or the existing technologies are briefly described hereinafter. Apparently, the accompanying drawings in the following description merely represent some embodiments of the present disclosure. One of ordinary skill in the art may still derive other drawings from these accompanying drawings without making any creative effort.

DETAILED DESCRIPTION

Figure 1:
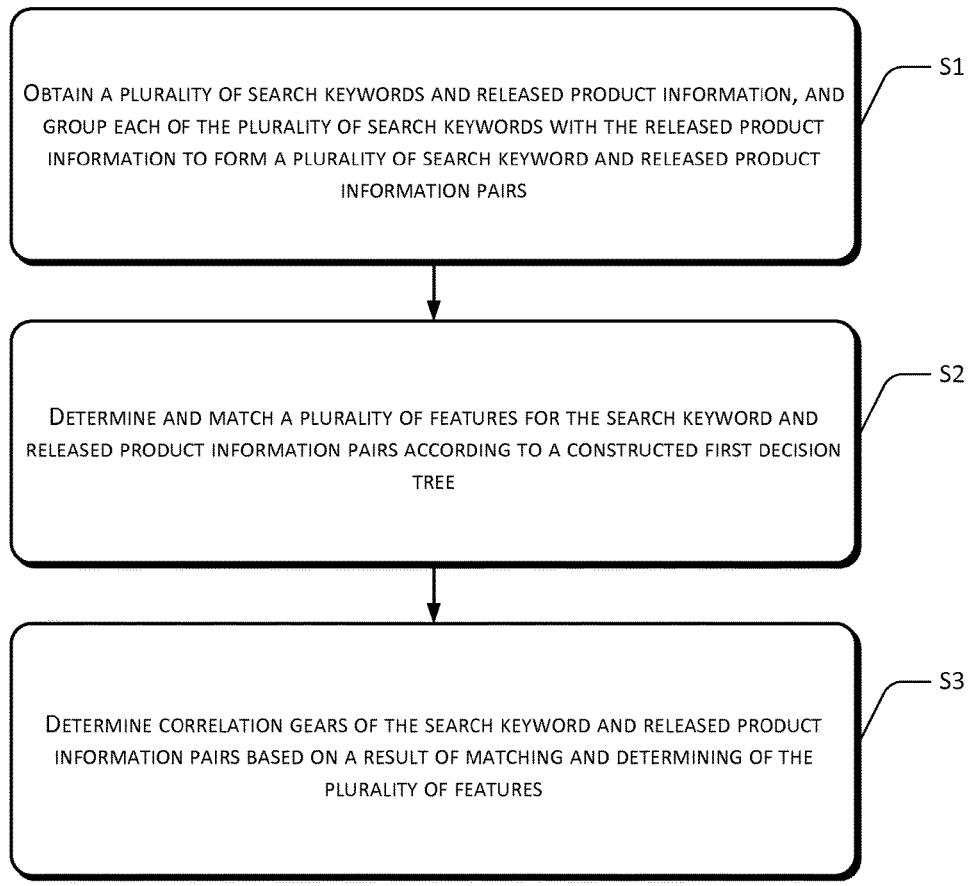
FIG. 1 is a flowchart illustrating a determination method for matching an object to be displayed according to an embodiment of the present disclosure.

With the development of computer and Internet technologies, the types of services provided in the Internet are constantly being improved. B2B (Business to Business e-commerce mode) is able to provide customers with a better service through a rapid response of the network to promote business development of enterprises. A B2B website platform provides buyers with products of high quality at low prices, and draws more sellers to join in while attracting the buyers to purchase.

In order to allow better exposure of products and increase the volume of product sales, sellers may choose a B2B website platform for performing advertising and promotion, with the B2B website recommending products that match with an object to be displayed to buyers. The matching of the object to be displayed includes recommending products that satisfy a purchase intention of a buyer when the buyer searches for a product. A main method of advertising and promotion is keyword recommendation. A seller needs to purchase a search keyword (a query, i.e., term(s) used when searching for a product) for released product information (i.e., an offer, which includes a title, an image, a keyword, a description, etc., of a product). Furthermore, when a buyer inputs that search keyword, the B2B website quickly and effectively displays released product information of the seller, thereby improving the rate of exposure of the product, and promoting the revenue of the seller. As can be seen from the above, a higher degree of matching between a search keyword purchased by a seller and released product information, i.e., a higher matching degree of an object to be displayed, leads to a better product promotion effect. Therefore, determining a matching degree between each search keyword and released product information, and recommending a seller to purchase a search keyword having a high matching degree can achieve a better promotion effect of an associated product.

The present disclosure groups each of a plurality of search keywords with released product information to form respective search keyword and the released product information pairs, and performs matching and determination of a plurality of features based on a constructed first decision tree, thereby determining correlation class of the search keyword and released product information pairs according to a result of matching and determination of the plurality of features. Therefore, the present disclosure does not need to adopt a linear model constructed by text correlation features to calculate a correlation score between a search keyword and released product information, or to label values of the text correlation features associated with the search keyword and released product information pairs. The present disclosure is able to accurately and conveniently determine a matching degree between the search keyword and the released product information, thereby reducing customer complaints and maintenance cost.

In order to enable one skilled in the art to understand the technical solutions of the present disclosure in a better manner, the technical solutions in the embodiments of the present disclosure are described clearly and completely hereinafter with reference to the accompanying drawings associated with the embodiments of the present disclosure. Apparently, the described embodiments merely represent a portion of and not all of the embodiments of the present disclosure. Based on the embodiments in the present disclosure, all other embodiments derived by one of ordinary skill in the art without making any creative effort shall fall within the scope of protection of the present disclosure.

A determination method provided by an embodiment of the present disclosure for matching an object to be displayed is described. An advertising method is generally applied at a management server end of a website (for example, websites such as B2B, B2C, etc.) for determining a matching degree between each search keyword and released product information of a seller so as to recommend the seller to purchase an appropriate search keyword.

With reference to FIG. 1, the first method of the present disclosure includes the following method blocks:

S1 obtains a plurality of search keywords and released product information, and groups each of the plurality of search keywords with the released product information to form a plurality of search keyword and released product information pairs.

S2 determines and matches a plurality of features for the search keyword and released product information pairs according to a constructed first decision tree.

S3 determines correlation classes of the search keyword and released product information pairs based on a result of matching and determining of the plurality of features.

In order to facilitate understanding of implementations of the present disclosure, a principle of an algorithm of a decision tree is briefly introduced hereinafter.

A decision tree is a type of classifier. The decision tree is constructed using training data, and is able to efficiently classify unknown data. The decision tree has two main advantages: 1) A decision tree model has a good readability, and possesses a describable characteristic, thereby facilitating a manual analysis; 2) the decision tree, with a high efficiency, only needs to be constructed once and can be repeatedly used, with the maximum number of computations for each predication not exceeding the depth of the decision tree.

The decision tree is constructed as follows.

With reference to Table 1, each record in Table 1 is considered as a node.

TABLE 1

| ID | Whether condition 1 is satisfied | Whether condition 2 is satisfied | Determination result |
|---|---|---|---|
| 1 | Yes | Yes | Result 1 |
| 2 | No | Yes | Result 2 |
| 3 | Yes | No | Result 3 |
| ... | ... | ... | ... |

Figure 2:
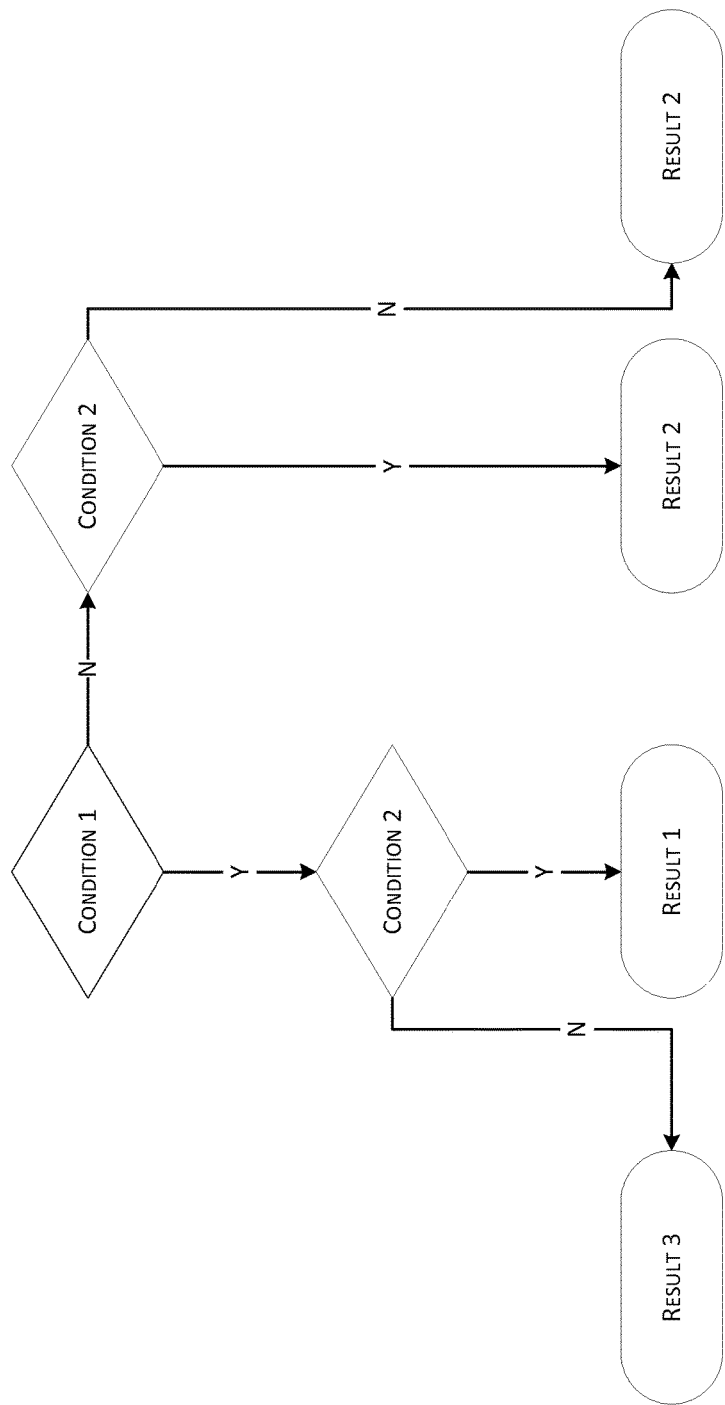
FIG. 2 is a schematic diagram illustrating a construction of a decision tree.

With reference to FIG. 2, a decision tree as shown in FIG. 2 is obtained from training using each record in Table 1, or apparently, may be converted into another form of decision tree. The decision tree is usually constructed based on human experience. A decision tree that best conforms to a real result is selected as a constructed decision tree using determination results that are obtained from a manual analysis of a plurality of types of constructed decision trees. A determination result of the decision tree in FIG. 2 may be obtained by performing determination using other data that is not displayed in Table 1.

By constructing a first decision tree, the disclosed method determines correlation classes of the search keyword and released product information pairs from a combination of relationships determined by matching the plurality of features, thereby determining a matching degree between each search keyword and the released product information of a seller, and recommending the seller to purchase a suitable search keyword. The disclosed method is able to accurately and conveniently determine a matching degree between a search keyword and released product information, and thereby reduce customer complaints and maintenance cost. The disclosed method increases a matching degree for advertising and promotion, and is able to achieve better advertising and product promotion, thus improving user experience of a website.

In order to accurately determine a matching situation associated with a search keyword and released product information pair, matching and determining the plurality of features may include at least one of matching and determination of category feature(s) or matching and determination of text feature(s).

If matching and determining the plurality of features in the first decision tree contains matching and determination of category feature(s) and matching and determination of text feature(s), the matching and determination of the category feature(s) is upstream of the matching and determination of the text feature(s).

In order to determine and match the plurality of features for the search keyword and released product information pairs in a better manner, obtaining the plurality of search keywords and the released product information at S1 may further include performing a preprocessing on the plurality of search keywords and the released product information. The preprocessing may include at least one of normalization processing of the plurality of search keywords and a title of the released product information, removal of meaningless symbols, removal of gibberish, removal of invisible characters, removal of pointless punctuation marks, or removal of redundant words.

In an embodiment, the preprocessing may further include an extraction of semantic feature(s) needed for matching the plurality of features at S2. The disclosed method performs subsequent matching and determination of the plurality of features using the extracted semantic feature(s) of the plurality of search keywords and the released product information.

Furthermore, the matching and determination of the category feature(s) corresponds to a determination of whether the search keyword and the released product information belong to a same category.

In an exemplary implementation of the present disclosure, the matching and determination of the category feature(s) usually refers to determining a category based on a textual meaning. If a category of the search keyword is the same as a category of the released product information, a result of the matching and determination of the category feature(s) is "Yes". Otherwise, the result of the matching and determination of the category feature(s) is "No".

A special case for the result of the matching and determination of the category feature(s) as "No" is that the search keyword has no category. For a search keyword having no category, a tail thereof is usually severely long, with the long tail corresponding to a search keyword that is rarely used by users in searching.

For example, if a search keyword is "mp3" and a released product is "audio player", which belong to a same category, a result of the category feature matching and determination is "Yes". If the search keyword is "mp3" and the released product is "radio", which do not belong to a same category, the result of the category feature matching and determination is "No".

In another implementation of the present disclosure, in order to perform the matching and determination of the category feature(s) in a more accurate manner, determining whether the search keyword and the released product information belong to the same category is preferentially performed based on a category prediction result if the search keyword contains the category prediction result, i.e., whether a result of the matching and determination of the category feature(s) is "Yes", rather than using the textual meaning to perform the matching and determination of the text category feature(s).

Determination of a category property of a search keyword depends on whether the search keyword contains a category prediction result. For example, if a search keyword is an Internet buzzword, the search keyword will be classified into a category to which the Internet buzzword belongs, rather than performing text category feature matching and determination based on textual meaning.

For example, if a search keyword is "little apple", the search keyword will be classified into a category of songs, falling within a matching category of released product information that also belongs to the category of songs.

When a search keyword has a category prediction result and a category predicted by the category prediction result is different from a category predicted from the category feature matching and determination that is based on the textual meaning, the category predicted by the category prediction result is selected to be a category to which the search keyword belongs.

For example, if a search keyword is "little apple", the search keyword is to be classified into a category of songs, falling within a matching category of released product information which also belongs to the category of songs, rather than classifying the search keyword "little apple" into a category of fruits, falling within a matching category of released product information which also belongs to the category of fruits, that is obtained from matching and determining category feature(s) based on textual meaning.

In an embodiment, the category feature matching and determination may include at least one of an original term category feature matching and determination, or an extended term category feature matching and determination.

The original term category feature matching and determination is to determine whether an original term of a search keyword and released product information belong to a same category. If a category of the search keyword is the same as a category of the released product information, a result of the original term category feature matching and determination is "Yes". Otherwise, the result of the original term category feature matching and determination is "No".

The extended term category feature matching and determination is to determine whether an extended term of a search keyword and released product information belong to a same category. If a category of the extended term of the search keyword is the same as a category of the released product information, a result of the extended term category feature matching and determination is "Yes". Otherwise, the result of the extended term category feature matching and determination is "No".

Comparing an original term of a search keyword with released product information to determine whether they belong to a same category corresponds to the original term category feature matching and determination. Comparing an extended term of a search keyword term with released product information to determine whether they belong to a same category corresponds to the extended term category feature matching and determination. Whether a search keyword is an original term or an extended term may affect a result of the category feature matching and determination, and an extended term of the search keyword is usually an expansion of an original term by deleting some word(s).

For example, an original term of a search keyword is "8g red mp3". Through expansion by means of word deletion, a plurality of extended terms, namely "red mp3" and "mp3" are obtained. Although the meaning of the original term of the search keyword is changed, these extended terms do not change a category to which the original term belongs.

An extended term of a search keyword may serve as a complimentary reference for the category feature matching and determination that uses an original term of the search keyword. The extended term category feature matching and determination, and the original term category feature matching and determination are both exemplary implementations of the category feature matching and determination.

Furthermore, the text feature matching and determination is to determine whether a search keyword is related to textual content of released product information.

The text feature matching in the present disclosure is different from the existing technologies where a linear model constructed by text correlation features is adopted to calculate a correlation score between a search keyword and released product information. The present disclosure merely performs a determination as to whether a search keyword is correlated with text content of released product information, without labeling values of text correlation features for search keyword and released product information pairs using human experience, or adopting a linear model calculation to obtain a correlation score between the search keyword and the released product information.

Therefore, the present disclosure does not have such problems as occupying excessive resources, complicated operations, high maintenance cost and low explanation capability for customer complaints that are caused by labeling the values of the text correlation features for the search keyword and released product information pairs using human experience.

In an embodiment, the text feature matching and determination of the present disclosure includes at least one of a full matching judgment, a partial matching judgment, a headword matching judgment, a headword full matching judgment, implied hidden word matching judgment, and a reverse preposition matching judgment.

The full matching judgment is to determine whether a search keyword fully appears in a heading of released product information. If the search keyword fully appears in the heading of the released product information, a result of the full matching judgment is "Yes". Otherwise, the result of the full matching judgment is "No".

For example, if a search keyword is "mp3", and a heading of released product information is "8G mp3", a result of the full matching judgment for such search keyword and released product information pair is "Yes". If the search keyword is "mp4", and the heading of the released product information is "8G mp3", the result of the full matching judgment for such search keyword and released product information pair is "No".

The partial matching judgment is to determine whether a search keyword partially appears in a heading of released product information. If the search keyword partially appears in the heading of the released product information, a result of the partial matching judgment is "Yes". Otherwise, the result of the partial matching judgment is "No".

For example, if a search keyword is "mp4", and a heading of released product information is "8G mp3", a result of the partial matching judgment for such search keyword and released product information pair is "Yes". If the search keyword is "radio", and the heading of the released product information is "8G mp3", the result of the partial matching judgment for such search keyword and released product information pair is "No".

The headword matching judgment is to determine whether a headword of a search keyword overlaps with a headword of a heading of released product information. If the headword of the search keyword overlaps with the headword of the heading of the released product information, a result of the partial matching judgment is "Yes". Otherwise, the result of the headword matching judgment is "No".

For example, a search keyword is "red mp3 player", and a headword thereof is "mp3". A heading of released product information is "8G mp3", and a headword thereof is also "mp3". A result of the headword matching judgment for such search keyword and released product information pair is "Yes". For example a search keyword is "red mp4 player", and a headword thereof is "mp4". A heading of released product information is "8G mp3", and a headword thereof is also "mp3". Hence, a result of the headword matching judgment for such search keyword and released product information pair is "No".

The headword full matching judgment is to determine whether a headword of a search keyword is fully identical with a headword of a heading of released product information. If the headword of the search keyword is fully identical with the headword of the heading of the released product information, the headword full matching judgment is "Yes". If the headword of the search keyword is partially identical with the headword of the heading of the released product information, the headword full matching judgment is "No". If the headword of the search keyword is completely different from the headword of the heading of the released product information, other matching judgments may be performed.

The hidden word matching judgment is to determine whether a search keyword contains a hidden word. If the search keyword contains a hidden word, a result of the hidden word matching judgment is "Yes". Otherwise, the result of the hidden word matching judgment is "No".

The hidden word of the search keyword is a special type of semantic information. For example, "phone" and "phone case", in which the "case" is a hidden word of the "phone". When a hidden word appears in the search keyword, a matching degree between the search keyword and the released product information may be decreased even if the search keyword fully appears in the heading of the released product information.

For example, if a search keyword is "phone case", and released product information is "phone", a result of the hidden word matching judgment for the search keyword is "Yes", so that a matching degree with the released product information being "phone" is decreased.

The reverse preposition matching judgment is to determine whether a search keyword contains a reverse preposition. If the search keyword contains a reverse preposition, a result of the reverse preposition matching judgment is "Yes". Otherwise, the result of the reverse preposition matching judgment is "No".

The reverse preposition and the hidden word of the search keyword have the same effect. A reverse preposition, such as "for" or "with", etc., may basically affect the meaning of the search keyword, and a matching degree between the search keyword and the released product information may also be decreased.

For example, if a search keyword is "case for phone", and released product information is "phone", a result of the reverse preposition matching judgment for the search keyword is "Yes", so that a matching degree with the released product information being "phone" is decreased.

Figure 3:
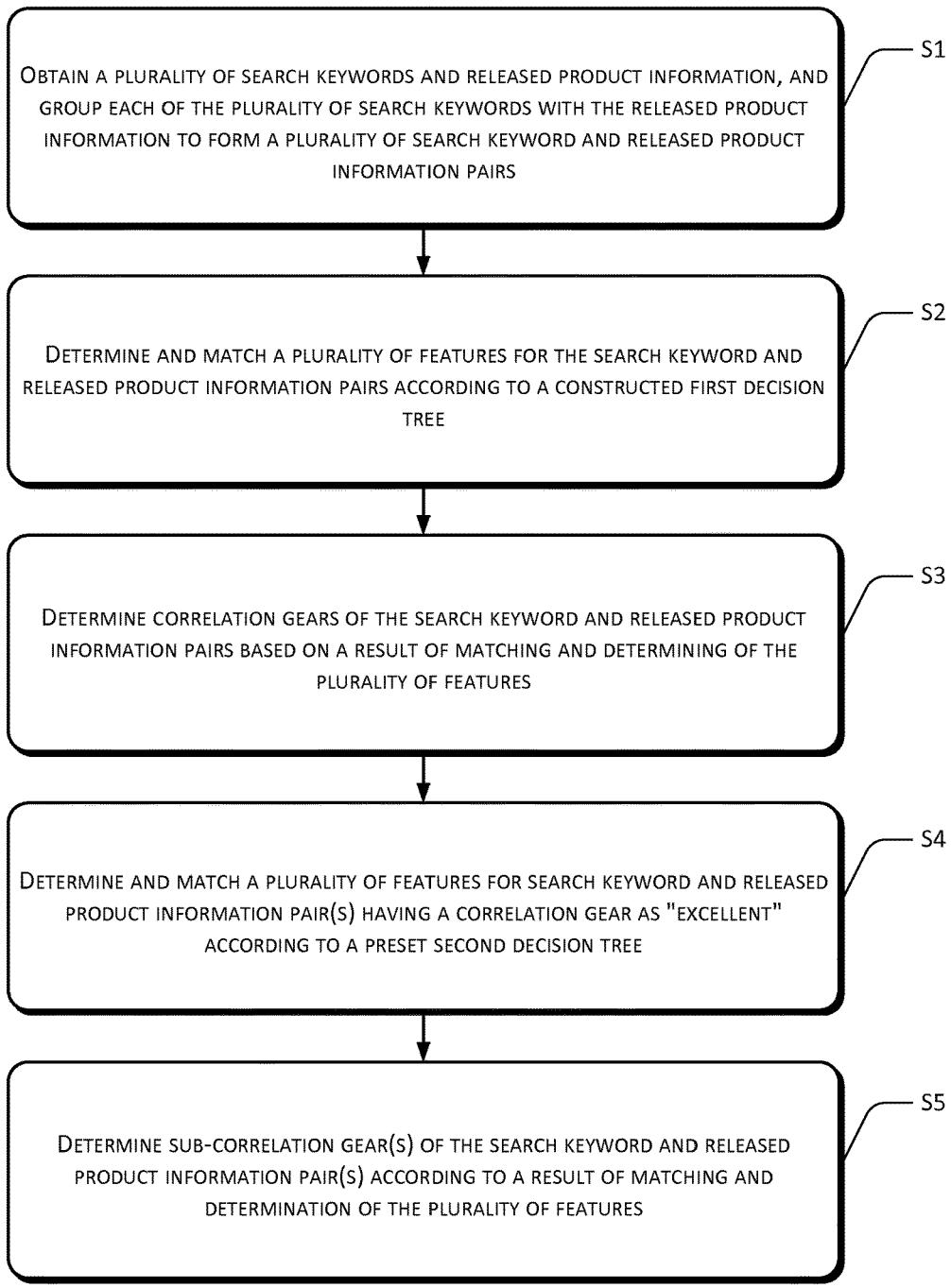
FIG. 3 is a flowchart of a determination method for matching an object to be displayed according to another embodiment of the present disclosure.

Furthermore, with reference to FIG. 3, a second method of the present disclosure further includes in addition to FIG. 1:

S4 determines and matches a plurality of features for search keyword and released product information pair(s) having a correlation class as "excellent" according to a preset second decision tree.

S5 determines sub-correlation class(es) of the search keyword and released product information pair(s) according to a result of matching and determination of the plurality of features.

Through S4 and S5, the present disclosure implements a further matching and determination of the search keyword and released product information pair(s) having a determined correlation class as "excellent", to further refine a sub-correlation class having the determined correlation class as "excellent", thus providing a search keyword having a higher matching degree with the released product information.

The principle of the present disclosure is described hereinafter via an example construction of a decision tree.

Specifically, the decision tree is usually constructed based on human experience. A decision tree that conforms to a real result the most is selected as a constructed first decision tree through determination results that are obtained from a manual analysis of a plurality of types of constructed decision trees. In a process of constructing the first decision tree, an order of importance includes the category feature matching judgment and the text feature matching judgment.

Figure 4:
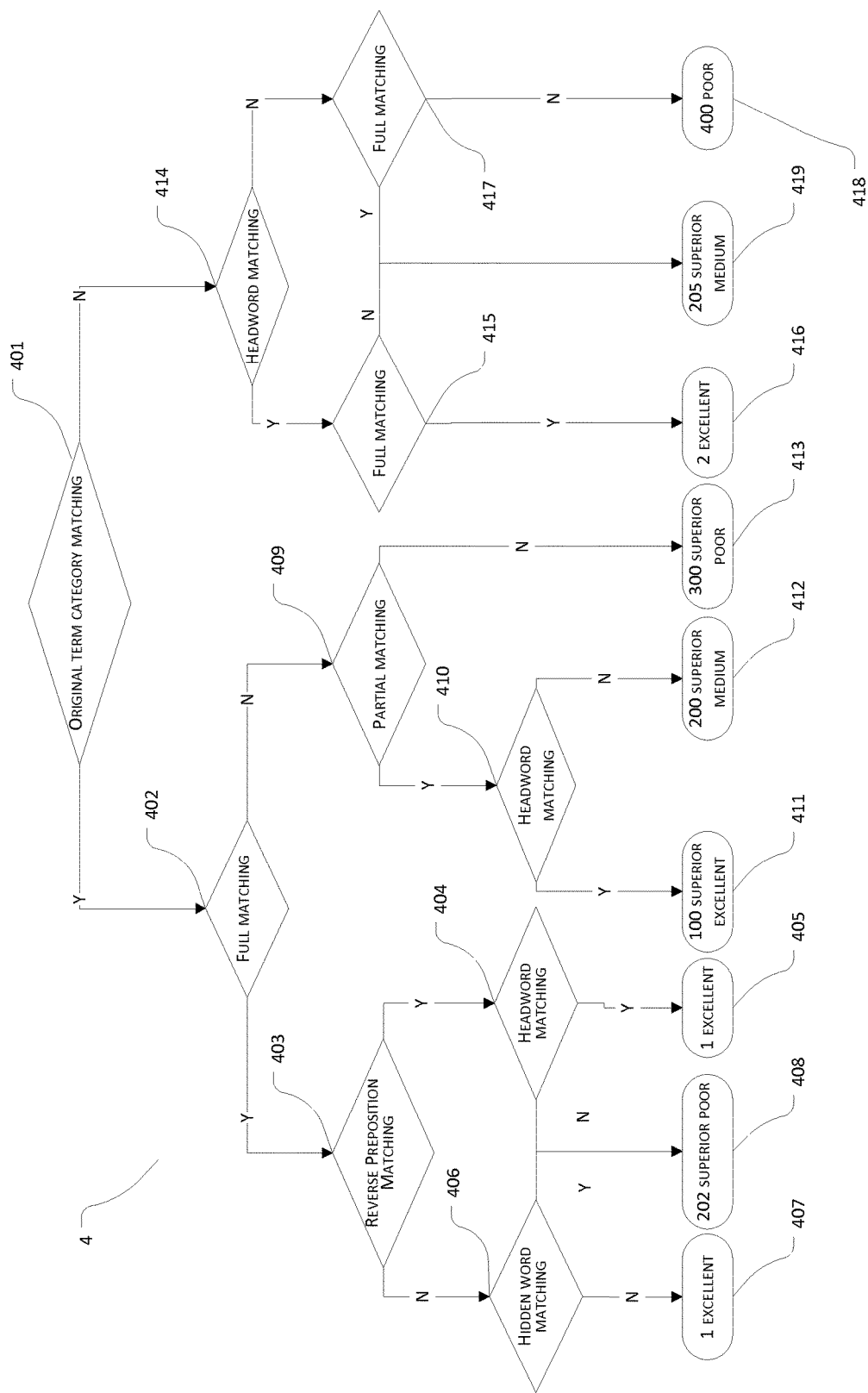
FIG. 4 is a schematic diagram illustrating a first decision tree according to an embodiment of the present disclosure.

With reference to FIG. 4, the present disclosure constructs a first decision tree 4. A process of performing result judgment on the first decision tree in the present disclosure is shown as follows.

S401 performs an original term category feature matching judgment on a search keyword and released product information pair.

S402 performs a full matching judgment if a result of the original term category feature matching judgment is "Yes".

S403 performs a reverse preposition matching judgment if a result of the full matching judgment is "Yes".

S404 performs a headword matching judgment if a result of the reverse preposition matching judgment is "Yes".

S405 determines that a matching result of the search keyword and released product information pair is 1, i.e., excellent, if a result of the headword matching judgment is "Yes", where "1" is an identification symbol of a correlation class "excellent";

S406 performs a hidden word matching judgment if a result of the reverse preposition matching judgment is "No".

S407 determines that the matching result of the search keyword and released product information pair is 1, i.e., excellent, if a result of the hidden word matching judgment is "No", where "1" is an identification symbol of the correlation class "excellent".

S408 determines that the matching result of the search keyword and released product information pair is 202, i.e., superior poor, if the result of the hidden word matching judgment is "Yes" or the result of the headword matching judgment at S404 is "No", where "202" is an identification symbol of a correlation class "superior poor".

S409 performs a partial matching judgment if the result of the full matching judgment is "No".

S410 performs a headword matching judgment if a result of the partial matching judgment is "Yes".

S411 determines that the matching result of the search keyword and released product information pair is 100, i.e., superior excellent, if a result of the headword matching judgment is "Yes".

S412 determines that the matching result of the search keyword and released product information pair is 200, i.e., superior medium, if the result of the headword matching judgment is "No", where "200" is an identification symbol of a correlation class "superior medium".

S413 determines that the matching result of the search keyword and released product information pair is 400, i.e., superior poor, if the result of the partial matching judgment is "No", where "400" is an identification symbol of a correlation class "superior poor".

S414 performs the headword matching judgment if the result of the original term category feature matching judgment is "No".

S415 performs the full matching judgment if the result of the headword matching judgment is "Yes".

S416 determines that the matching result of the search keyword and released product information pair is 2, i.e., excellent, if the result of the full matching judgment is "Yes", where "2" is an identification symbol of a correlation class "excellent".

S417 performs the full matching judgment if the result of the headword matching judgment is "No".

S418 determines that the matching result of the search keyword and released product information pair is 400, i.e., poor, if the result of the full matching judgment is "No", where "400" is an identification symbol of a correlation class "poor".

S419 determines that the matching result of the search keyword and released product information pair is 205, i.e., superior medium, if the result of the full matching judgment in at S416 is "No" or the result of the full matching judgment at S418 is "Yes", where "205" is an identification symbol of the correlation class "superior medium".

The present disclosure may implement a further matching judgment on any search keyword and released product information pair having a determined correlation class, to further refine a sub-correlation class of the determined correlation class. The present disclosure puts more emphasis on a search keyword and the released product information having a higher matching degree. Therefore, further determination is performed for a search keyword and released product information pair having a correlation class as "excellent" to provide a more accurate search keyword that matches with the released product information.

Figure 5:
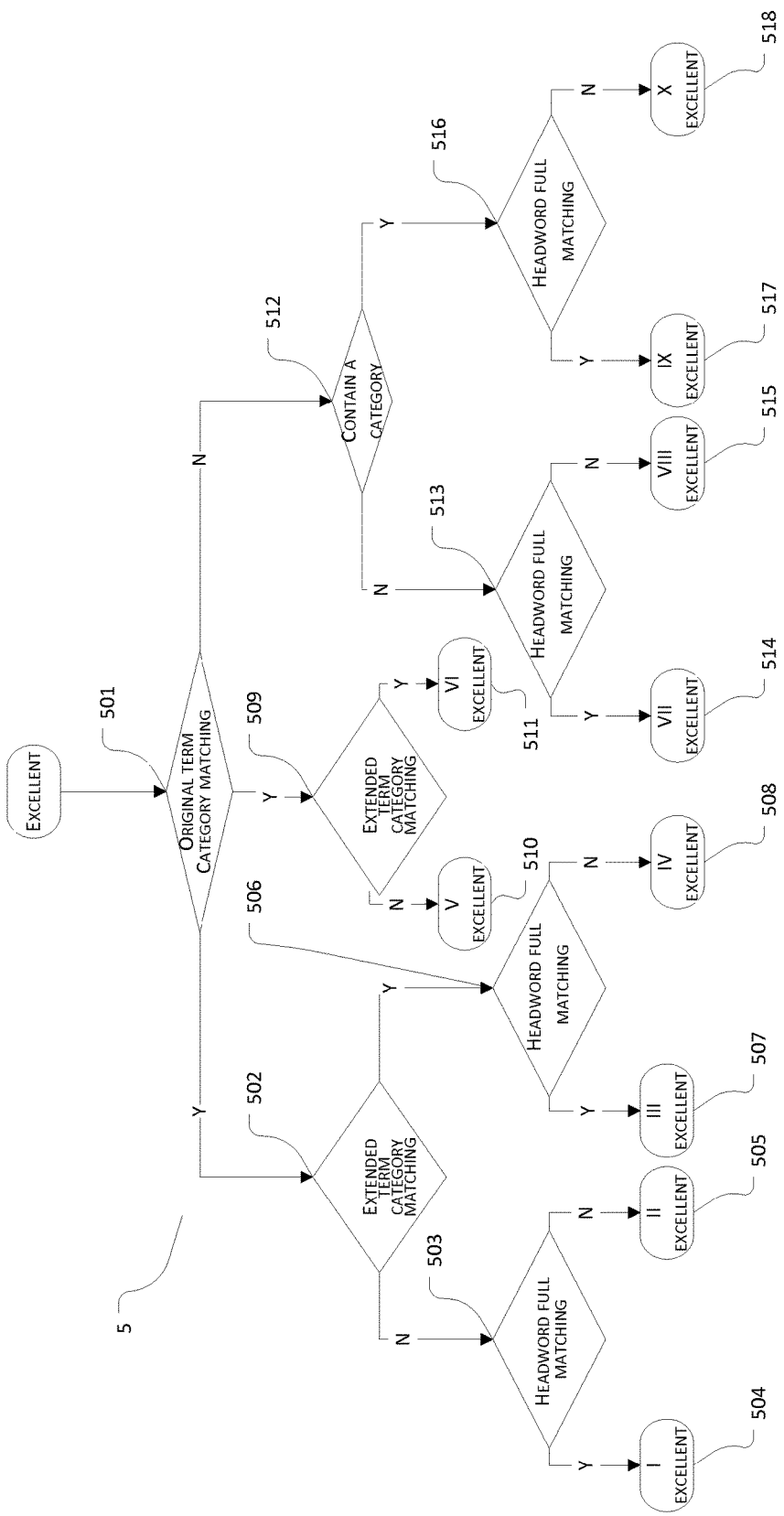
FIG. 5 is a schematic diagram illustrating a second decision tree according to another embodiment of the present disclosure.

Specifically, with reference to FIG. 5, the present disclosure further constructs a second decision tree 5, for performing further determination of search keyword and released product information pair(s) having a correlation class as "excellent" with a matching result being "1 excellent", "2 excellent", etc., after passing the first decision tree 4. The process of performing the result determination based on the second decision tree in the present disclosure is given as follows.

S501 performs an original term category feature matching judgment on a search keyword and released product information pair having a matching result as excellent after passing the first decision tree 4.

S502 performs an extended category feature matching judgment if a result of the original term category feature matching judgment is "Yes".

S503 performs the headword full matching judgment if a result of the extended category feature matching judgment is "No".

S504 determines that a matching result of the search keyword and released product information pair is "I excellent" if a result of the headword full matching judgment is "Yes".

S505 determines that the matching result for the search keyword and released product information pair is "II excellent" if the result of the headword full matching judgment is "No". If a headword of the search keyword and a headword of a heading of the released product information are completely different, i.e., the headword full matching judgment cannot be executed, the process returns to S502, and continues with other matching judgment(s).

S506 performs the headword full matching judgment if the result of the extended category feature matching judgment is "Yes".

S507 determines that the matching result of the search keyword and released product information pair is "III excellent" if the result of the headword full matching judgment is "Yes".

S508 determines that the matching result for the search keyword and released product information pair is "IV excellent" if the result of the headword full matching judgment is "No". If the headword of the search keyword and the headword of the heading of the released product information are completely different, i.e., the headword full matching judgment cannot be executed, the process returns to S502, and continues with other matching judgment(s).

S509 performs the extended category feature matching judgment on search keyword and released product information pair(s) for which the headword full matching judgment cannot be performed at S505 and S508.

S510 determines that the matching result of the search keyword and released product information pair is "V excellent" if a result of the extended category feature matching judgment is "No".

S511 determines that the matching result of the search keyword and released product information pair is "VI excellent" if the result of the extended category feature matching judgment is "Yes".

S512 determines whether the search keyword contains a category if the result of the original term category feature matching judgment at S501 is "No".

S513 performs the headword full matching judgment if the search keyword does not include a category.

S514 determines that the matching result of the search keyword and released product information pair is "VII excellent" if the result of the headword full matching judgment is "Yes".

S515 determines that the matching result of the search keyword and released product information pair is "VIII excellent" if the result of the headword full matching judgment is "No".

S516 performs the headword full matching judgment if the search keyword includes a category.

S517 determines that the matching result of the search keyword and released product information pair is "IX excellent" if the result of the headword full matching judgment is "Yes".

S518 determines that the matching result of the search keyword and released product information pair is "X excellent" if the result of the headword full matching judgment is "No".

Corresponding to the above method, the present disclosure further provides a determination apparatus for matching of an object to be displayed, which is generally applied at a management server end of a B2B website, and is used for determining a matching degree between each search keyword and released product information of a seller, so as to recommend the seller to purchase an appropriate search keyword.

Figure 6:
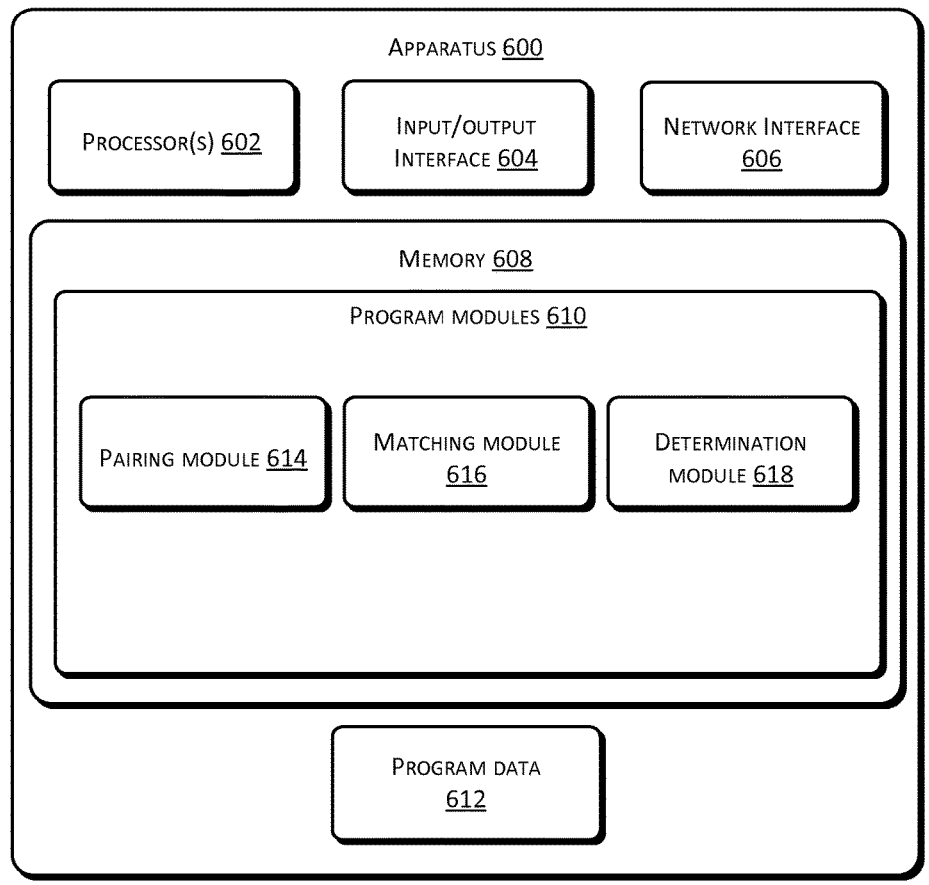
FIG. 6 is a structural diagram illustrating a determination apparatus for matching an object to be displayed according to an embodiment of the present disclosure.

In an embodiment, a management server end (or the determination apparatus 600) may include processor(s), memory, an input/output (I/O) device(s), and other hardware, as shown in FIG. 6. By way of example and not limitation, the determination apparatus 600 of the present disclosure may include one or more processors 602, an I/O (Input/Output) interface 604, a network interface 606 and memory 608.

The memory 608 may include a form of computer readable media such as volatile memory, Random Access Memory (RAM), and/or non-volatile memory, e.g., Read-Only Memory (ROM) or flash RAM, etc. The memory 608 is an example of a computer readable media.

The computer readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an embodiment, the memory 608 may include program modules 610 and program data 612. The program modules 610 may include a pairing module 614 to obtain a plurality of search keywords and released product information and to group each search keyword and the released product information to form a plurality of search keyword and released product information pairs; a matching module 616 to determine and match a plurality of features for the search keyword and released product information pairs according to a constructed first decision tree; and a determination module 618 to determine correlation classes of the search keyword and released product information pairs based on a result of determining and matching of the plurality of features.

By constructing a first decision tree, the disclosed apparatus 600 determines correlation classes of the search keyword and released product information pairs from a combined relationship determined by matching the plurality of features, thereby determining a matching degree between each search keyword and the released product information of a seller, and recommending the seller to purchase a suitable search keyword. The disclosed apparatus 600 is able to accurately and conveniently determine a matching degree between a search keyword and released product information, and thereby reduce customer complaints and maintenance cost. The disclosed apparatus 600 increases a matching degree for advertising and promotion, and is able to achieve better advertising and product promotion, thus improving user experience of a website.

In order to accurately determine a matching situation associated with a search keyword and released product information pair, matching and determining the plurality of features may include at least one of matching and determination of category feature(s) or matching and determination of text feature(s). If matching and determining the plurality of features in the first decision tree contains matching and determination of category feature(s) and matching and determination of text feature(s), the matching and determination of the category feature(s) is upstream of the matching and determination of the text feature(s).

In order to facilitate determining and matching of the plurality of features for the search keyword and released product information pairs, obtaining the plurality of search keywords and the released product information by the pairing module 614 may further include performing a preprocessing on the plurality of search keywords and the released product information. The preprocessing may include at least one of normalization processing of the plurality of search keywords and a title of the released product information, removal of meaningless symbols, removal of gibberish, removal of invisible characters, removal of pointless punctuation marks, or removal of redundant words.

Specifically, the preprocessing further includes an extraction of semantic feature(s) needed by the matching module 616 to match the plurality of features. The disclosed apparatus 600 performs subsequent matching and determination of the plurality of features using the extracted semantic feature(s) of the plurality of search keywords and the released product information.

Further, the category feature matching and determination is to determine whether the search keyword and the released product information belong to a same category.

In an exemplary implementation of the present disclosure, the category feature matching and determination usually refers to determining a category based on a textual meaning.

For example, if the search keyword is "mp3" and a released product is "audio player", both belong to a same category. If the search keyword is "mp3" and the released product is "radio", they do not belong to a same category.

In another implementation of the present disclosure, in order to perform the matching and determination of the category feature(s) in a more accurate manner, determining whether the search keyword and the released product information belong to the same category is preferentially performed based on a category prediction result if the search keyword contains the category prediction result, rather than using the textual meaning to perform the matching and determination of the text category feature(s).

Determination of a category property of a search keyword depends on whether the search keyword contains a category prediction result. For example, if a search keyword is an Internet buzzword, the search keyword will be classified into a category to which the Internet buzzword belongs, rather than performing text category feature matching and determination based on textual meaning.

For example, if a search keyword is "little apple", the search keyword will be classified into a category of songs, and released product information which also belongs to the category of songs falls within a category matching therewith.

When a search keyword has a category prediction result and a category predicted by the category prediction result is different from a category predicted from the category feature matching and determination that is based on the textual meaning, the category predicted by the category prediction result is selected to be a category to which the search keyword belongs.

For example, if a search keyword is "little apple", the search keyword is to be classified into a category of songs, and released product information which also belongs to the category of songs falling within a matching category, rather than classifying the search keyword "little apple" into a category of fruits that is obtained from matching and determining category feature(s) based on textual meaning, with released product information which also belongs to the category of fruits falling within the matching category.

In an embodiment, the category feature matching and determination may include at least one of an original term category feature matching and determination, or an extended term category feature matching and determination.

The original term category feature matching and determination is to determine whether an original term of a search keyword and released product information belong to a same category.

The extended term category feature matching and determination is to determine whether an extended term of a search keyword and released product information belong to a same category.

Comparing an original term of a search keyword with released product information to determine whether they belong to a same category corresponds to the original term category feature matching and determination. Comparing an extended term of a search keyword term with released product information to determine whether they belong to a same category corresponds to the extended term category feature matching and determination. Whether a search keyword is an original term or an extended term may affect a result of the category feature matching and determination, and an extended term of the search keyword is usually an expansion of an original term by deleting some word(s).

For example, an original term of a search keyword is "8g red mp3". Through expansion by means of word deletion, a plurality of extended terms, namely "red mp3" and "mp3" are obtained. Although the meaning of the original term of the search keyword is changed, these extended terms do not change a category to which the original term belongs.

An extended term of a search keyword may serve as a complimentary reference for the category feature matching and determination that uses an original term of the search keyword. The extended term category feature matching and determination, and the original term category feature matching and determination are both exemplary implementations of the category feature matching and determination.

Furthermore, the text feature matching and determination is to determine whether a search keyword is related to textual content of released product information.

The text feature matching in the present disclosure is different from the existing technologies where a linear model constructed by text correlation features is adopted to calculate a correlation score between a search keyword and released product information. The present disclosure merely performs a simple determination as to whether a search keyword is correlated with text content of released product information, without labeling values of text correlation features for search keyword and released product information pairs using human experience, or adopting a linear model to calculate to obtain a correlation score between the search keyword and the released product information.

Therefore, the present disclosure does not have such problems as occupying excessive resources, complicated operations, high maintenance cost and low explanation capability for customer complaints that are caused by labeling the values of the text correlation features for the search keyword and released product information pairs using human experience.

In an embodiment, the text feature matching and determination of the present disclosure includes at least one of a full matching judgment, a partial matching judgment, a headword matching judgment, a headword full matching judgment, a hidden word matching judgment, or a reverse preposition matching judgment.

The full matching judgment is to determine whether a search keyword fully appears in a heading of released product information.

For example, if a search keyword is "mp3", and a heading of released product information is "8G mp3", a result of the full matching judgment for such search keyword and released product information pair is "Yes". If the search keyword is "mp4", and the heading of the released product information is "8G mp3", the result of the full matching judgment for such search keyword and released product information pair is "No".

The partial matching judgment is to determine whether a search keyword partially appears in a heading of released product information.

For example, if a search keyword is "mp4", and a heading of released product information is "8G mp3", a result of the partial matching judgment for such search keyword and released product information pair is "Yes". If the search keyword is "radio", and the heading of the released product information is "8G mp3", the result of the partial matching judgment for such search keyword and released product information pair is "No".

The headword matching judgment is to determine whether a headword of a search keyword overlaps with a headword of a heading of released product information.

For example, a search keyword is "red mp3 player", and a headword thereof is "mp3". A heading of released product information is "8G mp3", and a headword thereof is also "mp3". A result of the headword matching judgment for such search keyword and released product information pair is "Yes". For example a search keyword is "red mp4 player", and a headword thereof is "mp4". A heading of released product information is "8G mp3", and a headword thereof is also "mp3". Hence, a result of the headword matching judgment for such search keyword and released product information pair is "No".

The hidden word matching judgment is to determine whether a search keyword contains a hidden word.

The hidden word of the search keyword is a special type of semantic information. For example, "phone" and "phone case", in which the "case" is a hidden word of the "phone". When a hidden word appears in the search keyword, a matching degree between the search keyword and the released product information may be decreased even if the search keyword fully appears in the heading of the released product information.

For example, if a search keyword is "phone case", and released product information is "phone", a result of the hidden word matching judgment for the search keyword is "Yes", so that a matching degree with the released product information being "phone" is decreased.

The reverse preposition matching judgment is to determine whether a search keyword contains a reverse preposition.

The reverse preposition and the hidden word of the search keyword have the same effect. A reverse preposition, such as "for" or "with", etc., may basically affect the meaning of the search keyword, and a matching degree between the search keyword and the released product information may also be decreased.

For example, if a search keyword is "case for phone", and released product information is "phone", a result of the reverse preposition matching judgment for the search keyword is "Yes", so that a matching degree with the released product information being "phone" is decreased.

Figure 7:
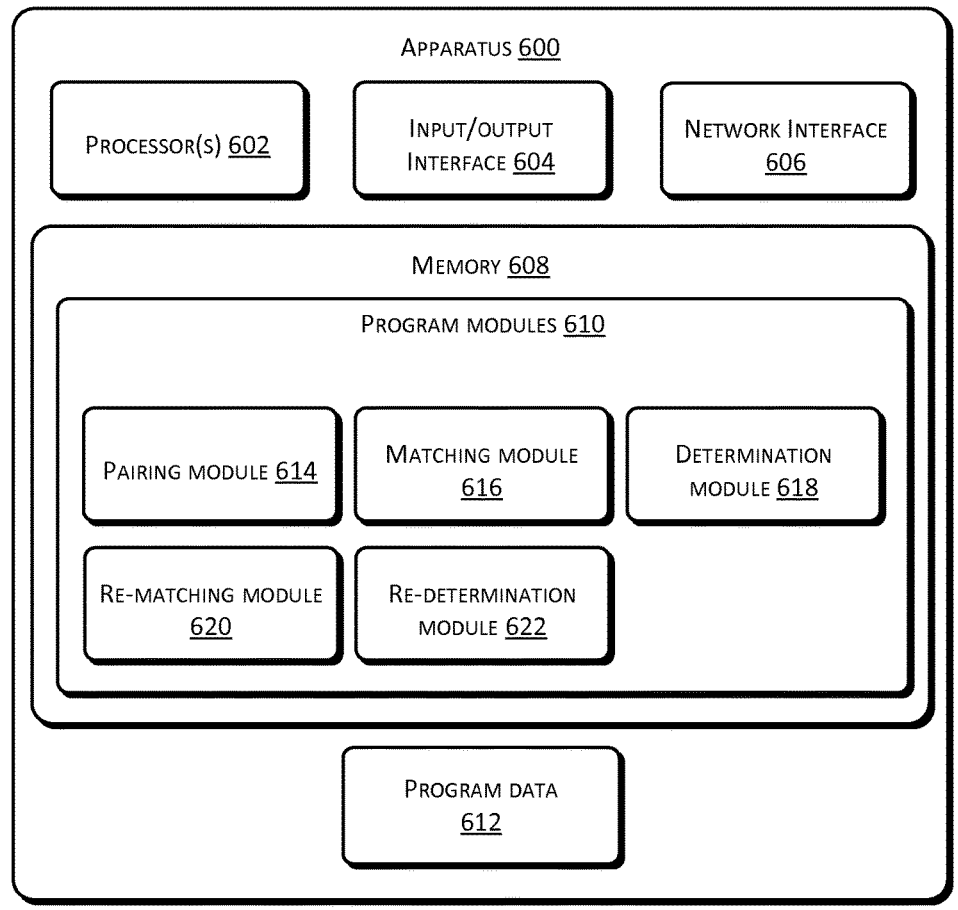
FIG. 7 is a structural diagram illustrating a determination apparatus for matching an object to be displayed according to another embodiment of the present disclosure.

In an embodiment, with reference to FIG. 7, the apparatus 600 of the present disclosure may further include a re-matching module 620 to determine and match multiple features for search keyword and released product information pair(s) having a correlation class as "excellent" according to a preset second decision tree; and a re-determination module 622 to determine respective sub-correlation class(es) of the search keyword and released product information pair(s) according to a result of determining and matching of the multiple features.

Using the re-matching module 620 and a re-determination module 622, the disclosed apparatus implements a further matching and determination of the search keyword and released product information pair(s) having a determined correlation class as "excellent", to further refine a sub-correlation class having the determined correlation class as "excellent", thus providing a search keyword having a higher matching degree with the released product information.

The foregoing description merely represent exemplary embodiments of the present disclosure, which are not construed as limitations of the present disclosure. Any changes, equivalent replacements, improvements, etc., that are made within the spirit and principle of the present disclosure shall fall within the scope of protection of the present disclosure.

What is claimed is:

1. A method implemented by one or more computing devices, the method comprising:
   obtaining a plurality of search keywords and released product information;
   grouping each of the plurality of search keywords with the released product information to form a plurality of search keyword and released product information pairs, with each search keyword and released product information pair including a respective search keyword and the released product information;
   determining and matching a plurality of features for the plurality of search keyword and released product information pairs according to a first decision tree;
   determining respective degrees of matching of the plurality of search keyword and released product information pairs based at least in part on a result of determining and matching of the plurality of features, wherein the first decision tree includes multiple levels of different types of determination and matching, different leaf nodes of the first decision tree represent different degrees of matching, and a leaf node to which a search keyword and released product information pair traverses from a root node of the first decision tree represents a corresponding degree of matching between the search keyword and the released product information of the search keyword and released product information pair; and
   returning a search keyword with a high degree of matching from the plurality of search keywords to a user for purchasing, wherein the returned search keyword is associated with a product.

2. The method of claim 1, wherein determining and matching of the plurality of features comprises one or more of a category feature matching and determination, and a text feature matching and determination, and wherein:
   the category feature matching and determination determines whether the respective search keyword and the released product information of each search keyword and released product information pair belong to a same category; and
   the text feature matching and determination determines whether the respective search keyword is related with textual content of the released product information.

3. The method of claim 2, wherein the category feature matching and determination includes one or more of an original term category feature matching and determination, and an extended term category feature matching and determination, and wherein:
   the original term category feature matching and determination is to determine whether an original term of the respective search keyword and the released product information of each search keyword and released product information pair belong to the same category; and
   the extended term category feature matching and determination is to determine whether an extended term of the respective search keyword and the released product information of each search keyword and released product information pair belong to the same category.

4. The method of claim 3, wherein the category feature matching and determination determines whether the respective search keyword and the released product information of each search keyword and released product information pair belong to the same category based at least in part on a category prediction result in response to the respective search keyword including the category prediction result.

5. The method of claim 2, wherein the text feature matching and determination includes one or more of a full matching judgment, a partial matching judgment, a headword matching judgment, a hidden word matching judgment and a reverse preposition matching judgment, and wherein:
   the full matching judgment is to judge whether the respective search keyword fully appears in a heading of the released product information;
   the partial matching judgment determines whether the respective search keyword partially appears in a heading of the released product information;
   the headword matching judgment determines whether a headword of the respective search keyword matches with a headword of the heading of the released product information;
   the hidden word matching judgment determines whether the respective search keyword contains a hidden word; and
   the reverse preposition matching judgment determines whether the respective search keyword contains a reverse preposition.

6. The method of claim 1, further comprising:
   determining and matching multiple features for one or more search keyword and released product information pairs having a respective correlation class as "excellent" according to a preset second decision tree; and
   determining respective one or more sub-correlation classes of the one or more search keyword and released product information pairs according to a result of determining and matching of the multiple features.

7. The method of claim 1, wherein obtaining the plurality of search keywords and the released product information comprises preprocessing the plurality of search keywords and the released product information, the preprocessing comprising extracting one or more semantic features for determining and matching the plurality of features.

8. An apparatus comprising:
   one or more processors;
   memory;
   a pairing module stored in the memory and executable by the one or more processors to obtain a plurality of search keywords and released product information and group each of the plurality of search keywords with the released product information to form a plurality of search keyword and released product information pairs, with each search keyword and released product information pair comprising a respective search keyword and the released product information;
   a matching module stored in the memory and executable by the one or more processors to determine and match a plurality of features for the plurality of search keyword and released product information pairs according to a first decision tree; and
   a determination module stored in the memory and executable by the one or more processors to determine respective degrees of matching of the plurality of search keyword and released product information pairs based at least in part on a result of determining and matching of the plurality of features, wherein the first decision tree includes multiple levels of different types of determination and matching, different leaf nodes of the first decision tree represent different degrees of matching, and a leaf node to which a search keyword and released product information pair traverses from a root node of the first decision tree represents a corresponding degree of matching between the search keyword and the released product information of the search keyword and released product information pair, wherein a search keyword with a high degree of matching is returned from the plurality of search keywords to a user for purchasing, the returned search keyword being associated with a product.

9. The apparatus of claim 8, wherein determining and matching of the plurality of features includes one or more of a category feature matching and determination, and a text feature matching and determination, and wherein:
the category feature matching and determination determines whether the respective search keyword and the released product information of each search keyword and released product information pair belong to a same category; and
the text feature matching and determination determines whether the respective search keyword is related with textual content of the released product information.

10. The apparatus of claim 9, wherein the category feature matching and determination include one or more of an original term category feature matching and determination, and an extended term category feature matching and determination, and wherein:
the original term category feature matching and determination determines whether an original term of the respective search keyword and the released product information of each search keyword and released product information pair belong to the same category; and
the extended term category feature matching and determination determines whether an extended term of the respective search keyword and the released product information of each search keyword and released product information pair belong to the same category.

11. The apparatus of claim 10, wherein the category feature matching and determination determines whether the respective search keyword and the released product information of each search keyword and released product information pair belong to the same category based at least in part on a category prediction result in response to the respective search keyword including the category prediction result.

12. The apparatus of claim 9, wherein the text feature matching and determination comprises one or more of a full matching judgment, a partial matching judgment, a headword matching judgment, a hidden word matching judgment and a reverse preposition matching judgment, and wherein:
the full matching judgment is to judge whether the respective search keyword fully appears in a heading of the released product information;
the partial matching judgment determines whether the respective search keyword partially appears in a heading of the released product information;
the headword matching judgment determines whether a headword of the respective search keyword matches with a headword of the heading of the released product information;
the hidden word matching judgment determines whether the respective search keyword contains a hidden word; and
the reverse preposition matching judgment determines whether the respective search keyword contains a reverse preposition.

13. The apparatus of claim 8, further comprising:
a re-matching module to determine and match multiple features for one or more search keyword and released product information pairs having a respective correlation class as "excellent" according to a preset second decision tree; and
a re-determination module to determine respective one or more sub-correlation classes of the one or more search keyword and released product information pairs according to a result of determining and matching of the multiple features.

14. The apparatus of claim 8, wherein the pairing module further preprocesses the plurality of search keywords and the released product information by extracting one or more semantic features for determining and matching the plurality of features.

15. One or more computer-readable media storing executable instructions that, when executed by one or more processors, to cause the one or more processors to perform acts comprising:
obtaining a plurality of search keywords and released product information and grouping each of the plurality of search keywords with the released product information to form a plurality of search keyword and released product information pairs, with each search keyword and released product information pair comprising a respective search keyword and the released product information;
determining and matching a plurality of features for the plurality of search keyword and released product information pairs according to a first decision tree;
determining respective degrees of matching of the plurality of search keyword and released product information pairs based at least in part on a result of determining and matching of the plurality of features, wherein the first decision tree includes multiple levels of different types of determination and matching, different leaf nodes of the first decision tree represent different degrees of matching, and a leaf node to which a search keyword and released product information pair traverses from a root node of the first decision tree represents a corresponding degree of matching between the search keyword and the released product information of the search keyword and released product information pair; and
returning a search keyword with a high degree of matching from the plurality of search keywords to a user for purchasing, wherein the returned search keyword is associated with a product.

16. The one or more computer-readable media of claim 15, wherein determining and matching of the plurality of features includes one or more of a category feature matching and determination, and a text feature matching and determination, and wherein:
the category feature matching and determination determines whether the respective search keyword and the released product information of each search keyword and released product information pair belong to a same category; and
the text feature matching and determination determines whether the respective search keyword is related with textual content of the released product information.

17. The one or more computer-readable media of claim 16, wherein the category feature matching and determination includes one or more of an original term category feature matching and determination, and an extended term category feature matching and determination, and wherein:
the original term category feature matching and determination is to determine whether an original term of the respective search keyword and the released product information of each search keyword and released product information pair belong to the same category; and the extended term category feature matching and determination is to determine whether an extended term of the respective search keyword and the released product information of each search keyword and released product information pair belong to the same category.

18. The one or more computer-readable media of claim 17, wherein the category feature matching and determination determines whether the respective search keyword and the released product information of each search keyword and released product information pair belong to the same category based at least in part on a category prediction result in response to the respective search keyword including the category prediction result.

19. The one or more computer-readable media of claim 16, wherein the text feature matching and determination comprises one or more of a full matching judgment, a partial matching judgment, a headword matching judgment, a hidden word matching judgment and a reverse preposition matching judgment, and wherein:

the full matching judgment is to judge whether the respective search keyword fully appears in a heading of the released product information;

the partial matching judgment determines whether the respective search keyword partially appears in a heading of the released product information;

the headword matching judgment determines whether a headword of the respective search keyword matches with a headword of the heading of the released product information;

the hidden word matching judgment determines whether the respective search keyword contains a hidden word; and the reverse preposition matching judgment determines whether the respective search keyword contains a reverse preposition.

20. The one or more computer-readable media of claim 15, the acts further comprising:

determining and matching multiple features for one or more search keyword and released product information pairs having a respective correlation class as "excellent" according to a preset second decision tree; and determining respective one or more sub-correlation classes of the one or more search keyword and released product information pairs according to a result of determining and matching of the multiple features.

* * * * *